(12) United States Patent
Dall'Agnol et al.

(10) Patent No.: US 7,524,982 B2
(45) Date of Patent: Apr. 28, 2009

(54) PROCESS FOR THE PRODUCTION OF BIODIESEL IN CONTINUOUS MODE WITHOUT CATALYSTS

(75) Inventors: Alcir Dall'Agnol, Estado do Rio Grande do Sul (BR); Ari Osvaldo Baldus, Estado do Rio Grande do Sul (BR); Cláudio Dariva, Estado do Rio Grande do Sul (BR); Elói Ricardo Nascimento Sobrinho, Estado do Rio Grande do Sul (BR); José Vladimir De Oliveira, Estado do Rio Grande do Sul (BR)

(73) Assignees: Intecnial S/A, Estado Do Grande Do Sul (BR); Fundacao Regional Integrada, Estado Do Grande Do Sul (BR)

( * ) Notice: Subject to any disclaimer, the term of this patent is extended or adjusted under 35 U.S.C. 154(b) by 306 days.

(21) Appl. No.: 11/477,451

(22) Filed: Jun. 30, 2006

(65) Prior Publication Data

US 2007/0010681 A1 Jan. 11, 2007

(30) Foreign Application Priority Data

Jul. 6, 2005 (BR) .................................... 0502891

(51) Int. Cl.
*C07C 51/43* (2006.01)
(52) U.S. Cl. ...................................... 554/174
(58) Field of Classification Search ................. 554/174
See application file for complete search history.

(56) References Cited

U.S. PATENT DOCUMENTS

| 4,695,411 A | 9/1987 | Stern et al. |
| 5,525,126 A | 6/1996 | Basu et al. |
| 6,015,440 A | 1/2000 | Noureddini |
| 6,174,501 B1 | 1/2001 | Noureddini |
| 6,211,390 B1 | 4/2001 | Peter et al. |
| 6,712,867 B1 | 3/2004 | Boocock |
| 2003/0032826 A1 | 2/2003 | Hanna |
| 2004/0022929 A1 | 2/2004 | Lee |

FOREIGN PATENT DOCUMENTS

| BR | 8300429 A | 1/1983 |
| BR | 8302341 A | 5/1983 |
| BR | 8600640 A | 2/1986 |
| BR | PI 0105888-6 A | 8/2003 |
| BR | PI 0107107-0 A | 8/2003 |
| WO | WO 03/022961 A1 | 3/2003 |
| WO | WO 2004/708873 A1 | 12/2004 |

OTHER PUBLICATIONS

S. Saka et al., "Biodiesel fuel from rapeseed oil as prepared in supercritical methanol" Fuel, 2001, 80, 225-231.
D. Kusdiana, et al., "Kinetics of transesterification in rapeseed oil to biodiesel fuel as treated in supercritical methanol", Fuel, 2001, 80, 693-698.
D. Kusdiana, et al., "Effects of water on biodiesel fuel production by supercritical methanol treatment", Bioresource Technology, 2004, 91, 289-295.

*Primary Examiner*—Deborah D Carr
(74) *Attorney, Agent, or Firm*—Sughrue Mion, PLLC

(57) ABSTRACT

A continuous, non catalytic process for producing biodiesel from vegetable oils and ethanol or methanol includes pumping a mixture of vegetable alcohol through a pump towards a tube shaped reactor, wherein the mixture is submitted to high pressure and temperature, where the resulting product is non reacted alcohol, glycerin and a mixture of esters (biodiesel) which is directed to the reservoir at the reactor outlet where an upper phase of alcohol is redirected through an alcohol return pipe to the pump inlet, and the intermediate phase, biodiesel, and the lower phase (mostly of glycerin) are led to the separation reservoir or decantation tank, where the alcohol is removed through the alcohol return pipe, being biodiesel and glycerin the final products, which are then collected for the end to which they were aimed.

12 Claims, 4 Drawing Sheets

PROCESS FOR THE PRODUCTION OF BIODIESEL IN CONTINUOUS MODE WITHOUT CATALYSTS

CROSS-REFERENCE TO RELATED PATENT APPLICATIONS

This application claims the benefit of Brazilian Patent Application No. PI 0502891-4, filed Jul. 6, 2005 in the Brazilian Intellectual Property Office, the disclosure of which is incorporated herein by reference

BACKGROUND OF THE INVENTION

1. Field of the Invention

Apparatuses and processes consistent with the present invention related to a process for the production of biodiesel in continuous mode without the use of a catalyst.

2. Description of the Related Art

Biodiesel is a potential substitute for diesel oil and consists of a mixture of fatty acids (methyl or ethyl) alkyl esters obtained from transesterification of vegetable oils with small chain alcohols (methanol or ethanol). In general terms, there are two routes which lead to a transesterification reaction: a catalytic and a non-catalytic route.

Within the catalytic route, there are processes with basic and/or acid catalysis (chemical catalysis) and enzyme employing processes (lipases) as catalysts (biocatalysts). Chemical catalysis (homogeneous or heterogeneous) has a long history of development and currently, biodiesel fuels produced by means of such methods are available in the market in some countries such as the United States, Japan, Australia and Western European countries. There are two basic disadvantages related to chemical catalysis produced biodiesel: during catalysis, the process is relatively slow and requires removal of the catalyst. Whereas during basic catalysis as well as purification of the catalyst product, the by-products of the saponification reaction must be removed. This process consists of the transesterification reaction, recovery of the non reacted alcohol, purification of the alkyl-esters and catalyst and separation of the glycerin from the reaction by-products. In such way, the process is unavoidably linked to high production costs and high power consumption.

Some of the disadvantages of the homogeneous chemical catalysis (product purification) may be overcome by using heterogeneous catalysts or enzymes as catalysts. Such processes are also costly due to the high cost of catalysts (heterogeneization of catalysts or enzymes). Likewise, in these processes, reaction time is longer still, since the reactions are produced with heterogeneous catalysts.

Recently, a process was disclosed in literature, which showed a non catalytic transesterification reaction in supercritical methanol (Saka and Kusdiana, Fuel, 2001, 80, 225-231; Saka and Kusdiana, Fuel, 2001, 80, 693-693; Kusdiana and Saka, Bioresource Technology, 2004, 91, 289-295). Reference is also made to US 2004/0,022,929; US2003/0,032,826; BR 0105888-6; U.S. Pat. No. 6,712,867; WO 03/22961; WO 2004/108873; U.S. Pat. No. 6,211,390; U.S. Pat. No. 6,174,501; U.S. Pat. No. 6,015,440; U.S. Pat. No. 5,525,126; U.S. Pat. No. 4,695,411; BR 0104107-0; BR 8300429-7; BR 8302341-0, as the state of the art.

It is noted that most of the disclosed processes in literature and patents are catalytic processes (homogeneous or heterogeneous chemical catalyzers and enzymes); they are processes which employ methanol as solvent and they are not continuous processes (bulk).

SUMMARY OF THE INVENTION

An object of this invention is a non catalytic process for biodiesel production in a continuous process which uses ethanol or methanol as solvent.

A continuous process of producing biodiesel without a catalyzer, according to an exemplary embodiment of the present invention, includes dispensing alcohol and vegetable oil, pumping the alcohol and vegetable oil into a reactor and applying a pressure between about 20 Bar and 400 Bar and a temperature between about 150° C. and 450° C. to the alcohol and oil in the reactor. A mixture of non-reacted alcohol, glycerin, and esters is thereby formed, and is released via a flow and pressure control valve. The mixture of non-reacted alcohol, glycerin, and esters is cooled in a cooler, and of the mixture, an upper phase of non-reacted alcohol is separated from an intermediate phase of esters and a lower phase of glycerin. The intermediate phase of esters and the lower phase of glycerin is directed to a separation reservoir and the esters are separated from the glycerin.

According to one exemplary aspect of the present invention, a certain amount of methanol and canola oil (molar ratio methanol/oil from 3.5:1 to 42:1) are placed in an autoclave and immersed in a controlled temperature thermostat bath (between 200 and 450° C.). After a certain amount of time, the reactor is removed from the hot bath and placed in a bath at room temperature in order to lower the temperature. The reactor is then opened. At 6 minute intervals, at temperatures of 350° C. and pressures of about 400 Bar, vegetable oil and fatty acid triglycerides may be converted into methyl esters of such oils with close to 100% conversions.

BRIEF DESCRIPTION OF THE DRAWINGS

In order to achieve a better understanding of the object of this patent, the same is exemplified by the accompanying drawings in which.

DETAILED DESCRIPTION OF EXEMPLARY EMBODIMENTS OF THE INVENTION

Figure 1:
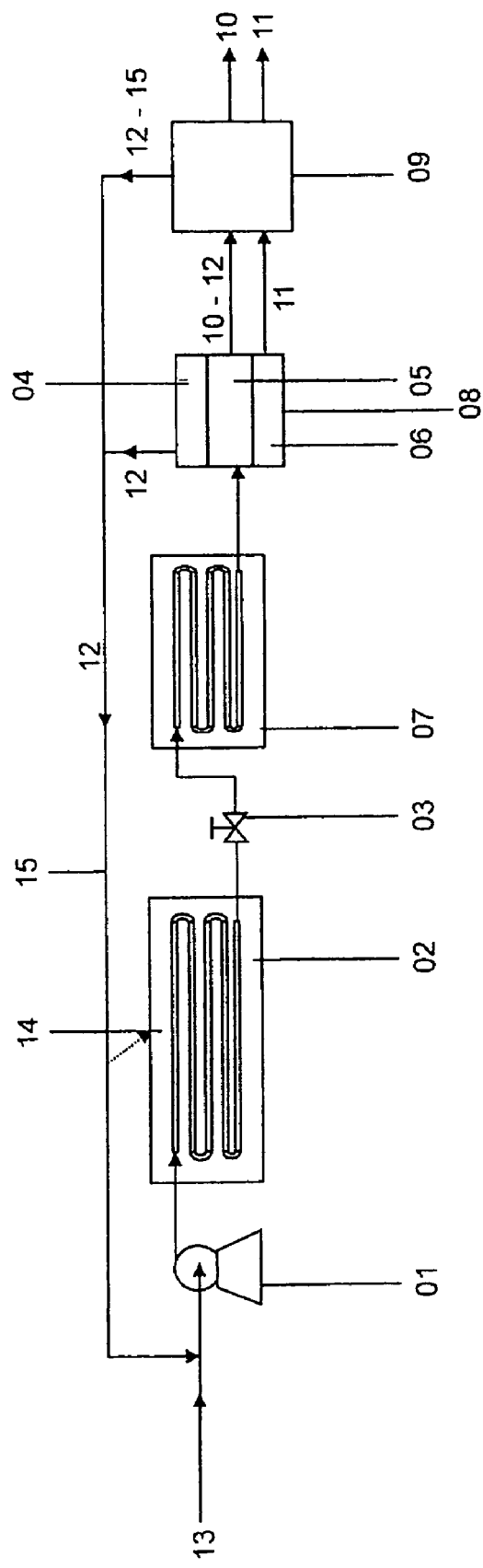
FIG. 01 is a schematic representation of a basic process according to an exemplary embodiment of the present invention.
Figure 2:
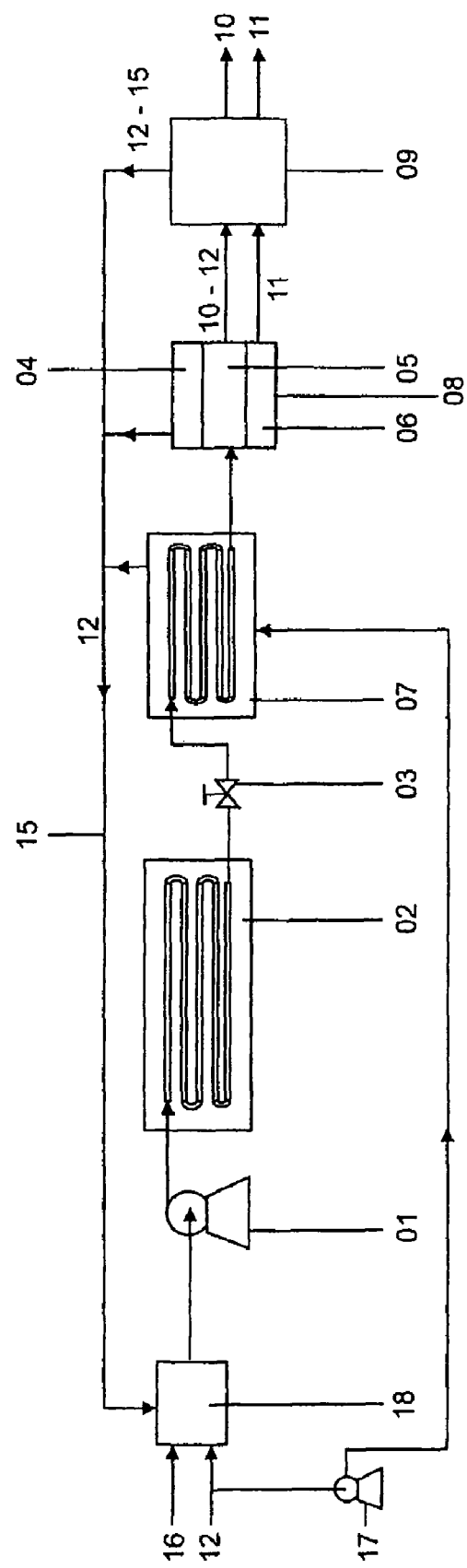
FIG. 02 is a schematic representation of an alcohol variant, cooling the cooler and returning alcohol-vegetable oil to the dispenser according to an exemplary embodiment of the present invention.
Figure 3:
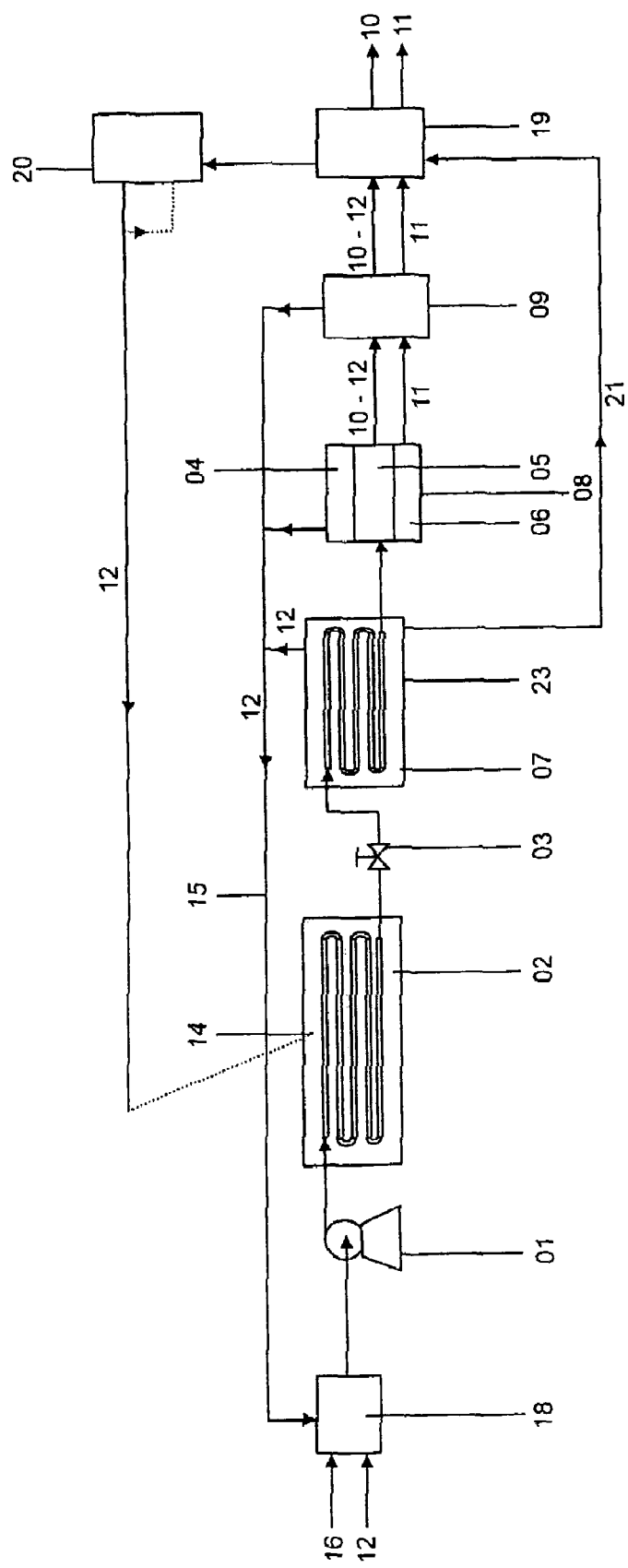
FIG. 03 is a schematic representation with a hot water washing unit according to an exemplary embodiment of the present invention.
Figure 4:
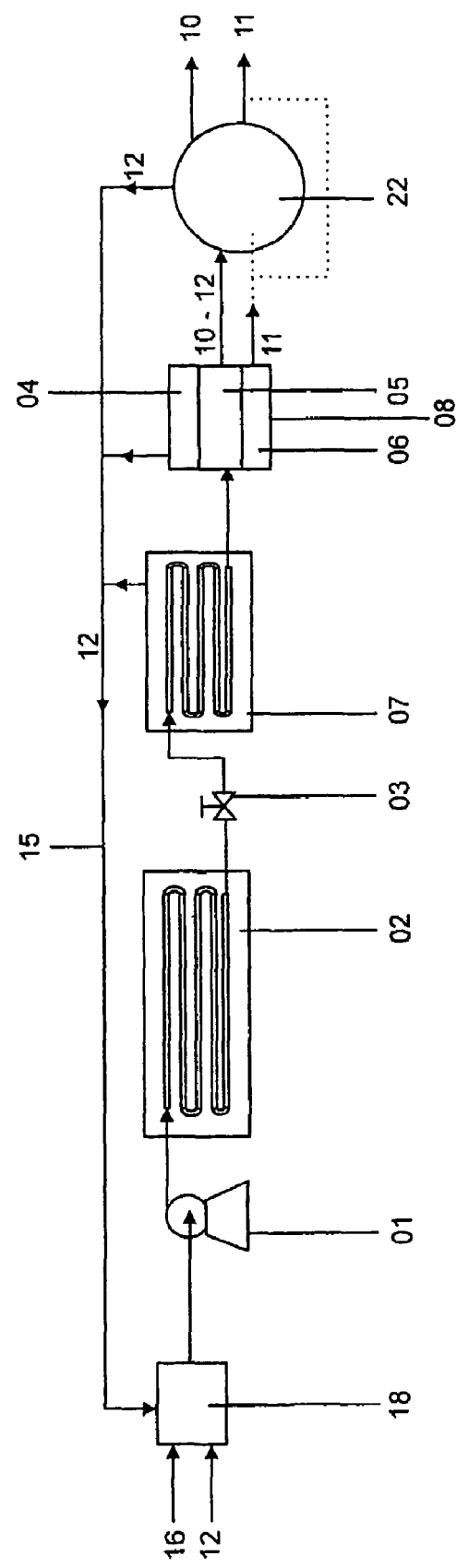
FIG. 04 is a schematic representation with a centrifugation unit according to an exemplary embodiment of the present invention.

The basic process according to an exemplary embodiment of the present invention consists of pumping, by means of a pump (01) the mixture of alcohol and vegetable oil (13), into a tube shaped reactor (02), where it will be submitted to high temperature (between about 150 and 450° C.) and pressure (between about 20 and 400 Bar), wherein the same will suffer reactions at the times set by the length of the reactor and the removal speed of the mixture. At the reactor outlet the mixture passes through a valve (03) which together with the pump (01) keeps the proper pressure and flow in the inside of the tube shaped reactor (02), consisting of non reacted ethanol or methanol, glycerin and a mixture of esters (biodiesel). The remaining time of the mixture (reactor volume divided by the mixture flow) within the reactor (between 30 seconds and 180 minutes) is controlled by the pump (01) and/or the valve (03). At the valve outlet (03) the mixture is cooled in a cooler (07) and then driven to the outlet reservoir of the reactor (08) wherein there will be three phases: an upper phase (04) (mainly alcohol (12), which may be ethanol or methanol), an intermediate phase (05) (mainly the ester mixture) forming the biodiesel (10) and a lower phase (06) (mostly glycerin (11)).

The alcohol (12), which may be ethanol or methanol, for example, which appears in the upper phase is separated and redirected through the alcohol return pipe (15) towards the pump inlet (01) of the tube shaped reactor (02), or then burnt to heat the tube shaped reactor (02) in the burner (14), or both. The biodiesel (10) and glycerin (11) phases are directed towards the separation reservoir (09) wherein they will be purified through evaporation, and the surplus alcohol (12) (e.g. ethanol or methanol) is directed to the return pipe (15). In the end the process yields biodiesel (10) and glycerin (11).

In order to obtain a better performance in the basic process some exemplary variants have been developed to optimize the same.

According to an exemplary aspect of the present invention, it is possible to cool the cooler (07) with cold alcohol (12), pumping with an alcohol pump (17), which, after exchanging heat, whether heated or not, returns to the alcohol-vegetable oil dispenser (18) which will dose the mixture in the ideal dose. This heated alcohol improves technical performance of the system since it will already be heated when entering the tube shaped reactor (02).

In another exemplary aspect, in order to speed up and improve separation of the surplus alcohol and the biodiesel, after decantation in the separation reservoir or decantation tank (09), this mixture of biodiesel (10) and alcohol (12) passes through a washing unit with hot water (19) where the removed alcohol (12) may be separated through distillation in the distillator (20) and reused, or entered into the alcohol return pipe (15), or directed towards the burners (14) of the tube shaped reactor (02) or to the burners of the distillator (20), or both. In order to optimize the equipment's thermal performance, the water (23) may be used as cooling liquid in the cooler (07), being pre heated, or being heated and channeled through the hot water pipe (21).

In another exemplary aspect, when there is not enough space for separation reservoirs or a decantation tank (09), or to speed up the processing without waiting the necessary time for a separation through decantation, one or more centrifugation units (22) may be used directly for the alcohol-biodiesel (10) (12) mixture and the glycerin (11), which yields alcohol (12), biodiesel (10) and glycerin (11), separately.

Although the process and its exemplary aspects and embodiments are described separately, the process may comprise any combination of its aspect and embodiments in order to obtain a more efficient performance thereof. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A continuous non-catalytic process of producing biodiesel, comprising:
    dispensing alcohol and vegetable oil;
    pumping the alcohol and vegetable oil into a reactor;
    applying a pressure between about 20 Bar and 400 Bar and a temperature between about 150° C. and 450° C. to the alcohol and vegetable oil in the reactor, thereby forming a mixture of non-reacted alcohol, glycerin, and esters;
    releasing the mixture of non-reacted alcohol, glycerin, and esters from the reactor via a flow and pressure control valve;
    cooling the mixture of non-reacted alcohol, glycerin, and esters in a cooler;
    of the mixture of non-reacted alcohol, glycerin, and esters, separating an upper phase of non-reacted alcohol from an intermediate phase of esters and a lower phase of glycerin and directing the intermediate phase of esters and the lower phase of glycerin to a separation reservoir;
    separating the esters from the glycerin.

2. The process of claim 1, wherein the alcohol comprises ethanol or methanol.

3. The process of claim 1 further comprising, prior to separating the esters from the glycerin, purifying the intermediate phase of esters and the lower phase of glycerin through evaporation.

4. The process of claim 1 further comprising:
    pumping the evaporated non-reacted alcohol back to the cooler;
    cooling the cooler with the non-reacted alcohol; and
    returning the non-reacted alcohol to be dispensed with the vegetable oil.

5. The process of claim 1 further comprising:
    pumping the evaporated non-reacted alcohol back to the reactor;
    heating the non-reacted alcohol at the reactor; and
    returning the non-reacted alcohol to be dispensed with the vegetable oil.

6. The process of claim 1, wherein separating the upper phase of non-reacted alcohol from the intermediate phase of esters and the lower phase of glycerin comprises passing the non-reacted alcohol, the esters, and the glycerin through a hot water washing unit and separating the upper phase of non-reacted alcohol through distillation.

7. The process of claim 6, further comprising
    pumping the evaporated non-reacted alcohol back to the reactor;
    heating the non-reacted alcohol at the reactor; and
    returning the non-reacted alcohol to be dispensed with the vegetable oil.

8. The process of claim 6 further comprising
    pumping the evaporated non-reacted alcohol back to the cooler;
    cooling the cooler with the non-reacted alcohol; and
    returning the non-reacted alcohol to be dispensed with the vegetable oil.

9. The process of claim 1, wherein separating the upper phase of non-reacted alcohol from the intermediate phase of esters and the lower phase of glycerin and separating the esters from the glycerin comprises
    separating the non-reacted alcohol, the esters, and the glycerin in one or more centrifugation units.

10. The process of claim 1 wherein the alcohol is methanol and the vegetable oil is canola oil and the molar ratio of the dispensed alcohol/vegetable oil is between about 3.5:1 and 42:1.

11. A non-catalytic process of producing biodiesel, comprising:
    mixing alcohol and vegetable oil;
    applying a pressure between about 20 Bar and 400 Bar and a temperature between about 150° C. and 450° C. to the alcohol and vegetable oil, thereby forming non-reacted alcohol, glycerin, and esters;
    cooling the non-reacted alcohol, glycerin, and esters; and
    separating the non-reacted alcohol, glycerin, and esters.

12. The process of claim 11, wherein the non-reacted alcohol is returned and utilized in the step of mixing alcohol and vegetable oil.

\* \* \* \* \*